US008825491B2

(12) United States Patent
Brunet et al.

(10) Patent No.: US 8,825,491 B2
(45) Date of Patent: *Sep. 2, 2014

(54) SYSTEM AND METHOD TO USE TEXT-TO-SPEECH TO PROMPT WHETHER TEXT-TO-SPEECH OUTPUT SHOULD BE ADDED DURING INSTALLATION OF A PROGRAM ON A COMPUTER SYSTEM NORMALLY CONTROLLED THROUGH A USER INTERACTIVE DISPLAY

(71) Applicant: Nuance Communications, Inc., Burlington, MA (US)

(72) Inventors: Peter Thomas Brunet, Round Rock, TX (US); Anh Quy Lu, Austin, TX (US); Mark Edward Nosewicz, Round Rock, TX (US); Lawrence Frank Weiss, Round Rock, TX (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,798

(22) Filed: Sep. 30, 2013

(65) Prior Publication Data

US 2014/0109081 A1 Apr. 17, 2014

Related U.S. Application Data

(63) Continuation of application No. 11/260,575, filed on Oct. 27, 2005, now Pat. No. 8,577,682.

(51) Int. Cl.
*G10L 21/06* (2013.01)
*G10L 25/00* (2013.01)
*G10L 13/00* (2006.01)
*G10L 13/08* (2013.01)
*G06F 9/445* (2006.01)
*G06F 9/44* (2006.01)

(52) U.S. Cl.
CPC ............... *G06F 8/61* (2013.01); *G06F 9/4446* (2013.01); *G06F 8/60* (2013.01)
USPC ........................... 704/271; 704/258; 704/260

(58) Field of Classification Search
USPC .................................................. 704/258–269
See application file for complete search history.

(56) References Cited

U.S. PATENT DOCUMENTS

| 5,794,052 | A | 8/1998 | Harding |
| 6,192,341 | B1 | 2/2001 | Becker et al. |
| 6,233,559 | B1 | 5/2001 | Balakrishnan |
| 6,289,312 | B1 | 9/2001 | Raman |

(Continued)

OTHER PUBLICATIONS

"JAWS for Windows Quick Start Guide". Published by Freedom Scientific, 11800 31st Court North, St. Petersburg, FL, USA. Aug. 2001.

(Continued)

*Primary Examiner* — Jesse Pullias
(74) *Attorney, Agent, or Firm* — Wolf, Greenfield & Sacks, P.C.

(57) ABSTRACT

An auditory user interactive interface to an application program being installed in the computer controlled system. A routine in an object, in an application program being installed in the computer controlled system for providing an auditory user interface to the program in combination with auditory means for offering the user of the computer controlled system the auditory user interface during installation of said application program, and responsive to the selection of the auditory interface provides the auditory user interface during said installation of the application program.

20 Claims, 4 Drawing Sheets

(56) References Cited

U.S. PATENT DOCUMENTS

| | | |
|---|---|---|
| 6,446,040 B1 | 9/2002 | Socher et al. |
| 6,456,973 B1 | 9/2002 | Fado et al. |
| 6,516,207 B1 | 2/2003 | Gupta et al. |
| 6,697,781 B1 | 2/2004 | Sahlberg |
| 6,795,084 B2 | 9/2004 | Newman |
| 6,996,533 B2 | 2/2006 | Ikeda et al. |
| 7,308,405 B2 | 12/2007 | Rose |
| 8,577,682 B2 | 11/2013 | Brunet et al. |

OTHER PUBLICATIONS

Bassford et al. "One for All and All for One: Making Engineering Learning Technology Accessible for All". International Conf. on Engineering Education, 2003.

Earl et al. "Putting Words to Windows: A Review of JAWS for Windows and Window-Eyes". p. 21-28. AccessWorld Mar. 2000, vol. 1 No. 2.

Thatcher, Jim. "Screen Reader/2—Programmed Access to the GUI". Computers for Handicapped Persons: Proceedings of ICCHP '94, Lecture Notes in Computer Science 860, pp. 76-88. Berlin: Springer.

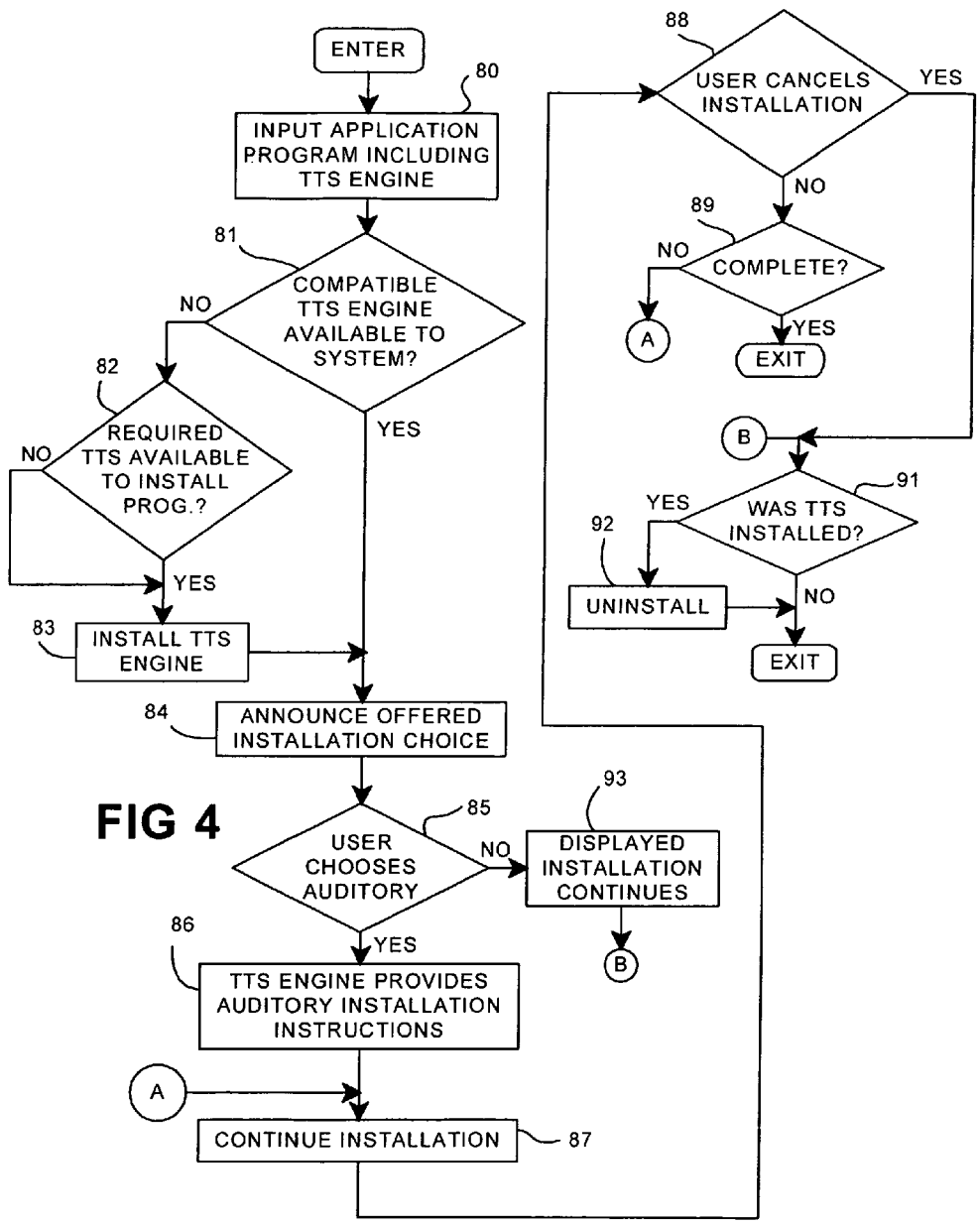

SYSTEM AND METHOD TO USE TEXT-TO-SPEECH TO PROMPT WHETHER TEXT-TO-SPEECH OUTPUT SHOULD BE ADDED DURING INSTALLATION OF A PROGRAM ON A COMPUTER SYSTEM NORMALLY CONTROLLED THROUGH A USER INTERACTIVE DISPLAY

RELATED APPLICATIONS

This application is a continuation of and claims priority under 35 U.S.C. §120 to U.S. patent application Ser. No. 11/260,575, filed Oct. 27, 2005, which is hereby incorporated by reference in its entirety.

TECHNICAL FIELD

The present invention relates to user-interactive computer systems, normally accessed through interactive displays and particularly to systems and methods that are user friendly and provide computer users with an auditory interface that is easy to use and does not impede the normal display interface system.

BACKGROUND OF RELATED ART

The past generation has been marked by a technological revolution driven by the convergence of the data processing industry with the consumer electronics industry. This advance has been even further accelerated by the extensive consumer and business involvement in the Internet over the past several years. As a result of these changes, it seems as if virtually all aspects of human endeavor in the industrialized world require human-computer interfaces. These changes have made computer directed activities accessible to a substantial portion of the industrial world's population, which, up to a few years ago, was computer-illiterate, or, at best, computer indifferent.

However, even more significant than these advances in opening new horizons to the general population has been the ability of the computer and the Internet to rescue people with even very severe physical impairments from lives of limited menial or no productivity. With the computer, a person with even slight dexterity or vision may, with sufficient effort, be capable of becoming as fully productive from his desktop as a person with full dexterity or vision.

This is possible because the computer may be tailored to the unique abilities of each individual. To this end, the computer industry is continuously seeking new implementations to bring more and more impaired individuals into full productivity in the workforce.

With an aging population, there is an increasing need to make computer technology readily accessible to visually impaired users. In the past, it was originally necessary to set up special computer operating systems "for the blind". In such an environment, it was necessary for the visually impaired to arrange for such a set up and then to order from a limited number of special application programs "for the blind". Because of the limited marketing potential for such special application programs, software providers have obviously kept the visually impaired users out of the mainstream of application programs.

However, as object oriented programming technology developed, it became easier to include in more application programs, an object providing a selectable auditory interface for the visually impaired. Such implementations still had their limitations. For instance, the computer system into which the application program was being installed had to have an auditory engine that was compatible with the routines in the application program object. In addition, the visually impaired user still needed help in the installation of the application program through the provision of a starting auditory interface during installation. Currently, this is being provided by a prerecorded auditory step by step presentation. Using prerecorded auditory presentation limits the flexibility and presentation of options during installation.

SUMMARY OF THE PRESENT INVENTION

The present invention addresses both the problems of: 1) incompatibility of the auditory interface objects and routines in the application programs being installed with auditory engines in the receiving computer system; and 2) providing an initial dynamic rather than a prerecorded auditory interface for and during the installation of the application program.

Accordingly, the present invention is directed to a computer controlled system normally interfaced through a user interactive display, and provides an auditory user interactive interface to an application program being installed in the computer controlled system. The system of the invention comprises a routine, preferably as an object, in an application program being installed in the computer controlled system for providing a dynamic auditory user interface to the program based upon Text to Speech (TTS) protocols in combination with TTS means for offering to the user of the computer controlled system the auditory TTS user interface during installation of said application program, and means responsive to the selection of the TTS interface for installation, for providing the auditory user interface during the installation of the application program.

The functional object in the application program being installed includes the routine for providing the auditory interface, preferably implemented in TTS functions, together with means for determining whether the computer controlled system receiving the application program includes a TTS engine compatible with said routine. There are means in the application program responsive to the means for determining whether the computer controlled system includes a TTS engine for installing a TTS engine compatible with the routine when the computer controlled system does not include the TTS engine. Further, there are means in the application program responsive to the means for determining whether the computer controlled system includes a TTS engine for modifying an already installed but not compatible TTS engine to a state compatible with the routine.

It is to be noted that all of the above steps are carried out initially and dynamically using TTS on installation of the application program, but before the user is given any interactive prompt so that the auditory user interface is available and on-line for the initial aural user installation prompt that is developed by TTS, e.g. "Do you want a spoken installation routine?". If the user answers "Yes", the auditory interface system commences, usually along with the conventional display prompts. If the user answers "No", the system continues the display interface during installation and takes steps to restore the computer system to its original operating state, as will be hereinafter described. In other words, the routine embodied in the application program will automatically set up a compatible TTS engine and initiate the auditory routine on it at the beginning of installation so that an initial auditory prompt to select auditory TTS installation instruction can be made. If the selection is "No", then any installed auditory engine or engine modification is uninstalled to revert the computer system to the original state so that installation of the application may be made using the conventional display interface for installation prompts and instructions.

As set forth above, the auditory engine used herein uses the conventional TTS techniques involving means for providing textual data representative of a sequence of the normal displayable user interactive dialog panels for the installation and TTS means for translating each of this sequence of dialog panels into each of a corresponding sequence of interactive auditory instructions and prompt panels.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 4 is a flowchart of an illustrative running of the steps set up in the program of FIG. 3.

DETAILED DESCRIPTION OF THE PREFERRED EMBODIMENT

Figure 1:
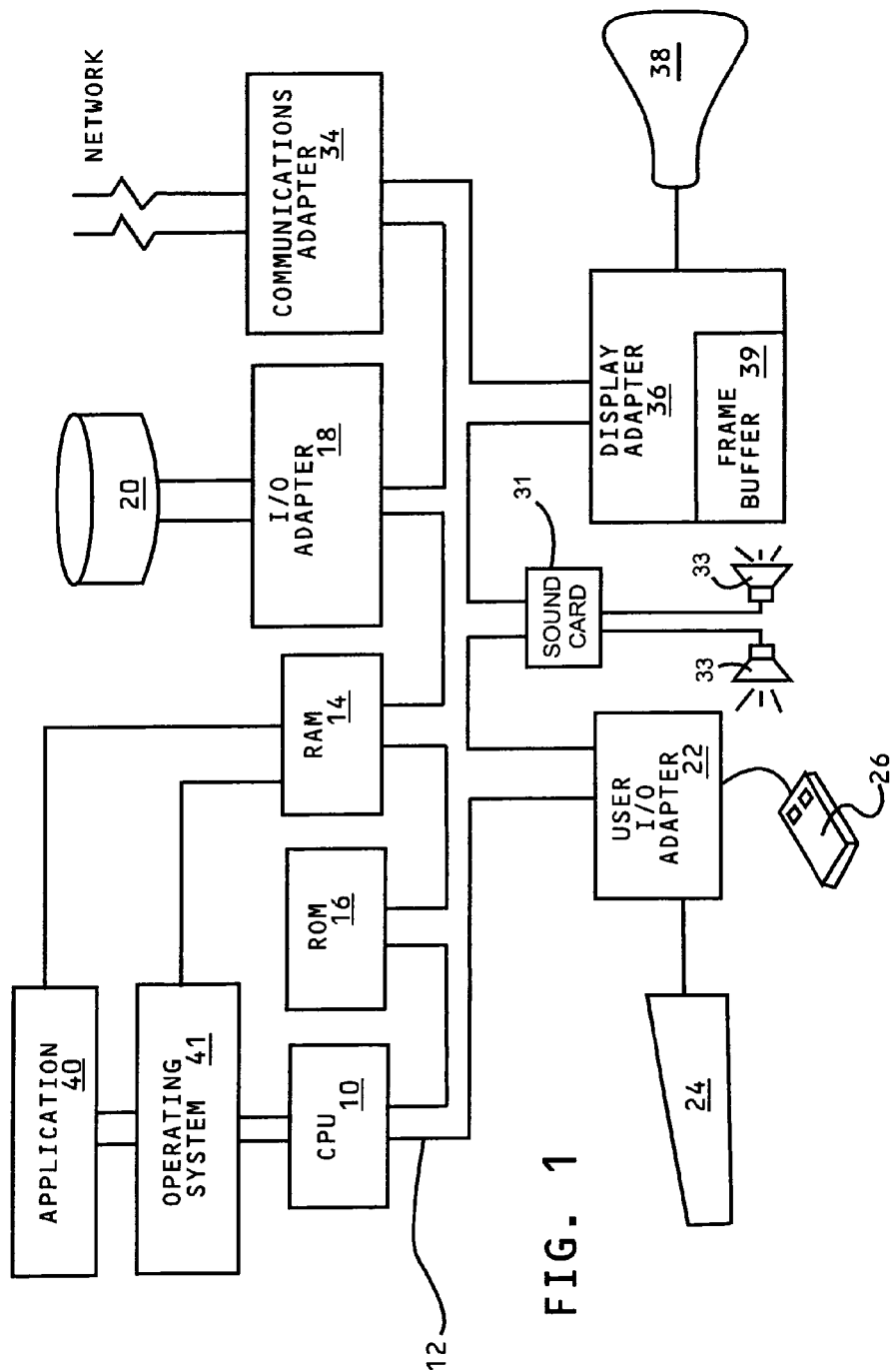
FIG. 1 is a block diagram of a generalized data processing system including a central processing unit that provides the normal computer controlled interactive display system, as well as the auditory installation interface that may be used in practicing the present invention.

Referring to FIG. 1, a typical data processing system is shown that may function as the computer controlled display terminal used in implementing the system of the present invention of providing, during the installation of an application program, an auditory user interactive interface to an application program being installed in the computer controlled system. A central processing unit (CPU) 10, such as one of the PC microprocessors or workstations, e.g. RISC System/6000™ series available from International Business Machines Corporation (IBM), or Dell PC microprocessors, is provided and interconnected to various other components by system bus 12. An operating system 41 runs on CPU 10, provides control and is used to coordinate the function of the various components of FIG. 1. Operating system 41 may be one of the commercially available operating systems, such as IBM's AIX 6000™ operating system or Microsoft's WindowsXP™ or Windows2000™, as well as UNIX and other IBM AIX operating systems. Application programs 40, controlled by the system, are moved into and out of the main memory Random Access Memory (RAM) 14. These programs include the programs of the present invention for providing, during the installation of an application program, an auditory TTS user interactive interface to the application program being installed in the computer controlled system. The auditory TTS engine, which will be discussed in greater detail hereinafter, is part of the operating system 41 when already present in the computer. However, when there is no auditory engine installed in the computer or the installed engine needs to be modified so as to be compatible with the auditory installation routine in the application program, then either the auditory engine itself or the modifications to the already installed engine will be included in the application program 40. Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside Internet or Web network. I/O devices are also connected to system bus 12 via user interface adapter 22 and display adapter 36. A conventional keyboard 24 (with the standard I/O device for the visually impaired), and mouse 26 are all interconnected to bus 12 through user interface adapter 22. It is through such input devices that the user may interactively relate to the programs of this invention. Display adapter 36 includes a frame buffer 39 that is a storage device that holds a representation of each pixel on the display screen 38. Images may be stored in frame buffer 39 for display on monitor 38 through various components, such as a digital to analog converter (not shown) for CRTs and the like for digital displays, e.g. LCD displays. The sound or audio system providing the interface to users on which the auditory interface may be implemented includes any conventional computer sound card 31 with associated speakers 33. Conventional sound systems that may be used are described in Chapter 5, pp. 155-186 of the text, *Personal Computer Secrets*, published 1999, IDG Books Worldwide, Inc., Foster City, Calif.

Figure 2:
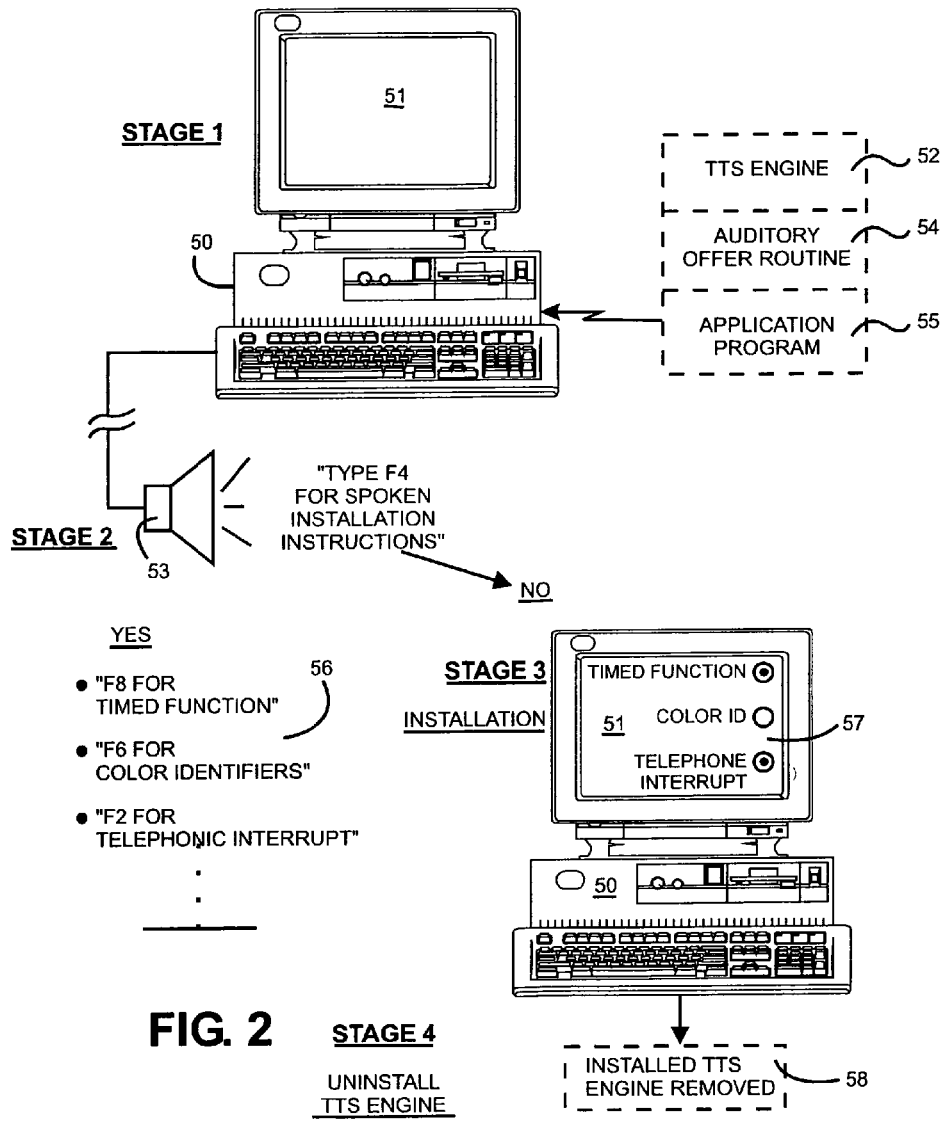
FIG. 2 is a diagrammatic view illustrative of the four stages in the installation of the application programs of the present invention through the normal display interface contrasted with the interactive auditory interfaces provided by these application programs.

Now with reference to FIG. 2, there is illustrated the installation stages in the present invention. Since TTS implementations are referred to, some background may be appropriate. Broadly, it is a known process of converting digital text to a speech output. TTS is used extensively for audio weather alerts and telephone messages and prompting. TTS uses a speech synthesis application that is used to create a sound version of a computer document. TTS is also used by assistive technology programs for reading of computer display information for the visually impaired person. There are numerous TTS products on the market.

In Stage 1, application program 55 is to be installed into computer 50, which is normally interfaced through interactive display interface 51. Built into application program 55 is an object 54 that is set up to initially offer to the user, through speech, via an auditory routine, the alternative of continuing the whole installation of the application program via a supplemental auditory sequence of prompts and spoken commands. This object even includes a TTS engine 52 to be installed into computers that may not have any engine for generating auditory functions. The application program may also include functions that may be able to modify an auditory TTS engine already installed in the receiving computer 50 that is incompatible with the installation auditory routine. At this stage, the installation requirements are examined and a determination made as to whether any auditory TTS engine already on the computer 50 meets such requirements. These requirements may include the ability to process several languages. In one embodiment, the requirement may include compatibility with the locale in effect at the time of installation. Thus, the application program installation object requires a TTS engine that can issue instructions in several languages. The application program may have the capability of modifying the existing TTS engine in the computer so that the TTS engine is upgraded to issue instructions in the requisite languages or in the language that corresponds to the locale in effect at the time of installation.

Then, in Stage 2, the auditory output is rendered functional using the TTS engine, and there is an initial announcement from speaker 53 alerting and aurally prompting the user to take appropriate input action via the keyboard to initiate auditory instructions 56 in Stage 3, which are translated by the TTS engine directly from the prompts that would appear as dialog panels 57 on screen 51 of computer 50. Where a user selects to have the auditory instructions 56, it is probably most convenient to still proceed with the corresponding display instructions and prompts 57. However, in the case of the user not selecting spoken output, then, once the application program is installed, Stage 4, the installed auditory TTS engine or the TTS engine modifications are uninstalled 58 in Stage 4 to restore the receiving computer system to its original state.

Figure 3:
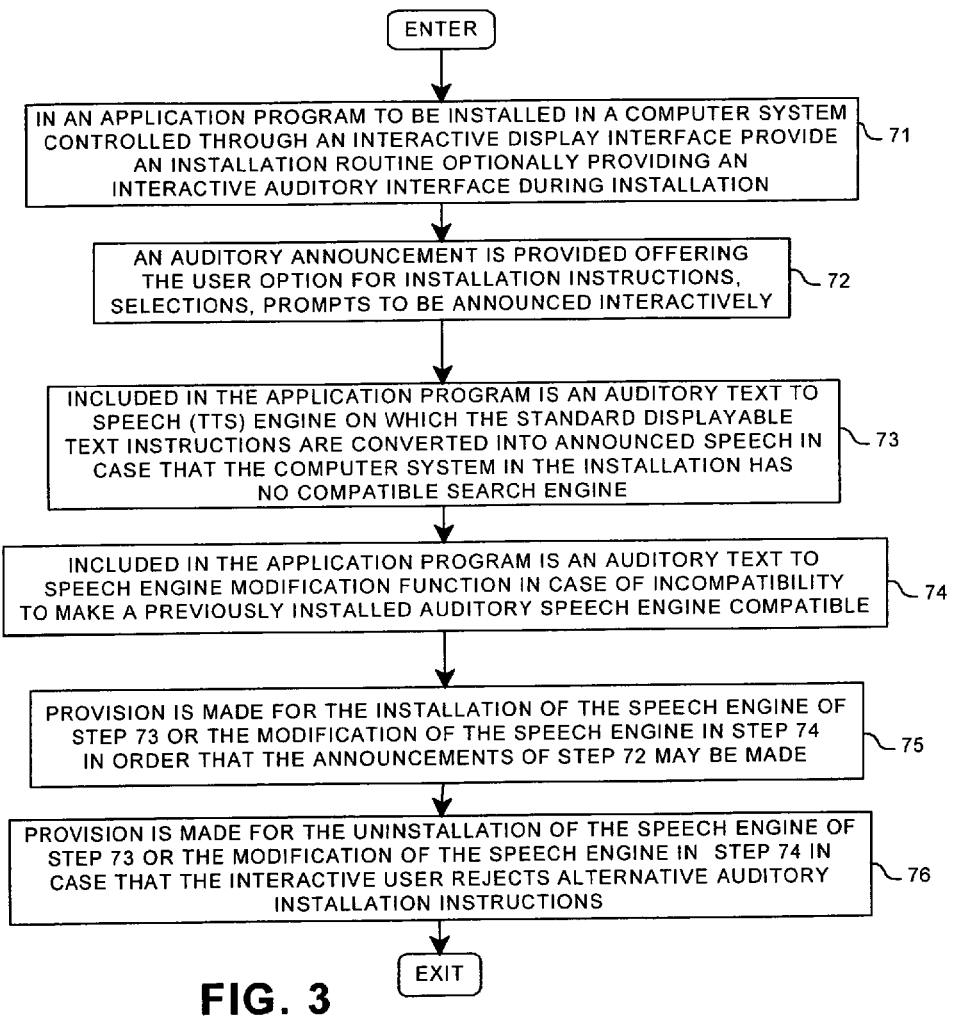
FIG. 3 is a flowchart of the steps involved in applying the system of the present invention to provide, during the installation, an auditory user interactive interface to an application program being installed in the computer controlled system.

Now, with reference to FIG. 3, we will describe a process implemented by a program according to the present invention for providing an interactive auditory interface during the installation of an application program. The application program to be installed already includes an installation routine for optionally providing this auditory interface, step 71. The routine provides for aurally offering to the user the initial choice of this auditory interface, step 72. There is provided in the application program, an auditory TTS engine on which the standard displayable text instructions are converted into announced speech in case the computer system in the installation has no compatible speech engine, step 73. Also includable in the application program is a function for modi⁰fying a TTS engine previously installed in the receiving computer system so that the TTS engine is compatible with the auditory TTS function being installed, step 74. Provision is made, step 75, in the application program for the installation of the speech engine of step 73 or the modification of step 74 in order that the announcements of step 72 may be made. Finally, provision is made for the uninstallation of the speech engine of step 73 or the modification of step 74 in the case that the interactive user rejects auditory installations, step 76.

In one embodiment, a provision is made for the uninstallation of the speech engine of step 73 or the modification of step 74 in the case that the interactive user declines an offer to accept a license agreement offered during the installation of the application program.

Now that the basic program has been described and illustrated, there will be described with respect to FIG. 4, a simple operation showing how the program could be run. Initially, step 80, the application program including an optional TTS engine and/or TTS engine modification function is input for installation into a computer system. A determination is made, step 81, as to whether the computer system already has a compatible auditory TTS engine available to it. There are several ways that such a TTS engine could be available: it may already be installed on the computer system on which the application program is being installed; a compatible TTS engine may be available on another computer system associated with the computer system of the installation so that the TTS engine may be transferred, step 82; or the application program may have a function capable of modifying an already installed TTS engine so that it is compatible. If both steps 81 and 82 are "No", then the TTS engine available in the application program is installed in step 83. If step 82 is "Yes", then the compatible TTS engine available from the associated computer system is transferred and installed in step 83. Then or if step 81 is "Yes", the initial TTS function in the computer system is functional and there is announced the choice prompt to the user to select the auditory installation procedure if desired, step 84. Next, if step 85 is "Yes", the user chooses auditory instructions, then the installation proceeds with added auditory instructions, step 86. If "No", the user does not require auditory instructions, and the installation can proceed using the standard interactive displayed instructions, step 93.

As the installation continues, step 87, the user is given opportunities, decision step 88, to cancel the installation (e.g. the user is dissatisfied with the contractual conditions offered during the installation and declines to accept the license agreement, or the user cancels the installation for any reason, or the user aborts the installation). If "No", the user chooses to continue, the installation continues and a determination is periodically made, step 89, as to whether the installation is completed. If "Yes", the process is exited, step 90; if "No", the process continues via branch "A" back to step 87. Now, if in step 88 the user decides "Yes" to cancel the installation or if the user by a "No" decision in step 85 has rejected TTS instructions and has proceeded with conventional display installation, then via branch "B" a final determination is made, step 91, as to whether any TTS engine has been installed. If "Yes", the TTS engine is uninstalled, step 92 before exiting. If "No", the process is directly exited.

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A method for use in connection with installing an application program on a computing device, the computing device comprising at least one processor, the method comprising:
   using the at least one processor to perform:
   prompting, using at least one auditory prompt, a user of the computing device to provide input specifying whether the user would like to have auditory assistance during installation of the application program; and
   conducting the installation of the application program in accordance with input received in response to the at least one auditory prompt.

2. The method of claim 1, further comprising:
   determining whether the computing device has an already-installed text-to-speech engine compatible for use with the installation of the application program; and
   if the computing device does not have an already-installed text-to-speech engine that is compatible, installing on the computing device a newly-installed text-to-speech engine that is compatible for use with the installation of the application program.

3. The method of claim 2, wherein:
   the at least one input comprises an indication that the user would like to not use auditory prompts for the installation of the application program; and
   if the computing device does not have the already-installed text-to-speech engine, conducting the installation in accordance with the at least one input comprises removing the newly-installed text-to-speech engine from the computing device responsive to the indication that the user would not like to use auditory prompts for the installation of the application program.

4. The method of claim 2, wherein:
   if the computing device does not have the already-installed text-to-speech engine, the method further comprises removing the newly-installed text-to-speech engine from the computing device following the installation of the application program.

5. The method of claim 1, wherein:
the at least one input comprises an indication that the user would like to use auditory prompts for the installation; and
conducting the installation in accordance with the at least one input comprises continuing the installation through one or more subsequent auditory prompts.

6. The method of claim 1, further comprising:
determining whether an already-installed text-to-speech engine installed on the computing device is compatible for use with the installation of the application program; and
if it is determined that the already-installed text-to-speech engine is not compatible, modifying the already-installed text-to-speech engine to be compatible for use with the installation of the application program.

7. The method of claim 1, wherein the computing device comprises a desktop computer.

8. At least one non-transitory computer-readable medium having stored thereon computer instructions which, when executed by a computing device, cause the computing device to perform a method comprising:
prompting, using at least one auditory prompt, a user of the computing device to provide input specifying whether the user would like to have auditory assistance during installation of the application program; and
conducting the installation of the application program in accordance with input received in response to the at least one auditory prompt.

9. The at least one non-transitory computer-readable medium of claim 8, wherein the computer instructions cause the computing device to perform:
determining whether the computing device has an already-installed text-to-speech engine compatible for use with the installation of the application program; and
if the computing device does not have an already-installed text-to-speech engine that is compatible, installing on the computing device a newly-installed text-to-speech engine that is compatible for use with the installation of the application program.

10. The at least one non-transitory computer-readable medium of claim 9, wherein:
the at least one input comprises an indication that the user would like to not use auditory prompts for the installation of the application program; and
if the computing device does not have the already-installed text-to-speech engine, conducting the installation in accordance with the at least one input comprises removing the newly-installed text-to-speech engine from the computing device responsive to the indication that the user would not like to use auditory prompts for the installation of the application program.

11. The at least one non-transitory computer-readable medium of claim 9, wherein:
if the computing device does not have the already-installed text-to-speech engine, the method further comprises removing the newly-installed text-to-speech engine from the computing device following the installation of the application program.

12. The at least one non-transitory computer-readable medium of claim 8, wherein:
the at least one input comprises an indication that the user would like to use auditory prompts for the installation; and
conducting the installation in accordance with the at least one input comprises continuing the installation through one or more subsequent auditory prompts.

13. The at least one non-transitory computer-readable medium of claim 8, wherein the computer instructions cause the at least one computing device to perform:
determining whether an already-installed text-to-speech engine installed on the computing device is compatible for use with the installation of the application program; and
if it is determined that the already-installed text-to-speech engine is not compatible, modifying the already-installed text-to-speech engine to be compatible for use with the installation of the application program.

14. A computing device comprising at least one processor programmed to perform a method comprising:
prompting, using at least one auditory prompt, a user of the computing device to provide input specifying whether the user would like to have auditory assistance during installation of the application program; and
conducting the installation of the application program in accordance with input received in response to the at least one auditory prompt.

15. The computing device of claim 14, wherein the at least one processor is programmed to perform:
determining whether the computing device has an already-installed text-to-speech engine compatible for use with the installation of the application program; and
if the computing device does not have an already-installed text-to-speech engine that is compatible, installing on the computing device a newly-installed text-to-speech engine that is compatible for use with the installation of the application program.

16. The computing device of claim 15, wherein:
the at least one input comprises an indication that the user would like to not use auditory prompts for the installation of the application program; and
if the computing device does not have the already-installed text-to-speech engine, conducting the installation in accordance with the at least one input comprises removing the newly-installed text-to-speech engine from the computing device responsive to the indication that the user would not like to use auditory prompts for the installation of the application program.

17. The computing device of claim 15, wherein:
if the computing device does not have the already-installed text-to-speech engine, the at least one processor is programmed to perform removing the newly-installed text-to-speech engine from the computing device following the installation of the application program.

18. The computing device of claim 14, wherein:
the at least one input comprises an indication that the user would like to use auditory prompts for the installation; and
conducting the installation in accordance with the at least one input comprises continuing the installation through one or more subsequent auditory prompts.

19. The computing device of claim 18, wherein the at least one processor is programmed to perform:
determining whether an already-installed text-to-speech engine installed on the computing device is compatible for use with the installation of the application program; and
if it is determined that the already-installed text-to-speech engine is not compatible, modifying the already-installed text-to-speech engine to be compatible for use with the installation of the application program.

20. The computing device of claim 14, wherein the computing device comprises a desktop computer.

\* \* \* \* \*